(12) United States Patent
Beffroy et al.

(10) Patent No.: US 6,763,872 B2
(45) Date of Patent: Jul. 20, 2004

(54) METHOD OF STRIPPING AN OPTICAL FIBER

(75) Inventors: David Beffroy, Morsang-sur-Orge (FR); Valérie Girardon, Bretigny/Orge (FR); Hervé Loury, Gentilly (FR)

(73) Assignee: Avanex Corporation, Fremont, CA (US)

( * ) Notice: Subject to any disclaimer, the term of this patent is extended or adjusted under 35 U.S.C. 154(b) by 9 days.

(21) Appl. No.: 10/117,997

(22) Filed: Apr. 9, 2002

(65) Prior Publication Data

US 2002/0148559 A1 Oct. 17, 2002

(30) Foreign Application Priority Data

Apr. 12, 2001 (FR) .............................. 01 05032

(51) Int. Cl.⁷ .............................................. B32B 35/00
(52) U.S. Cl. .................. 156/584; 156/344; 81/9.41; 81/9.51; 7/107; 30/90.1
(58) Field of Search .............................. 156/344, 584; 81/9.4, 9.41, 9.42, 9.44, 9.51; 7/107; 30/90.1; 29/564.4

(56) References Cited

U.S. PATENT DOCUMENTS

| | | | |
|---|---|---|---|
| 4,710,217 A | | 12/1987 | Bailey et al. |
| 5,050,302 A | | 9/1991 | Mills |
| 5,298,105 A | * | 3/1994 | Dorsey ........................ 156/584 |
| 5,389,192 A | * | 2/1995 | Takimoto et al. ............ 156/584 |
| 5,481,638 A | | 1/1996 | Roll et al. |
| 5,522,939 A | | 6/1996 | Light, Jr. et al. |
| 5,531,581 A | * | 7/1996 | Donnell, Jr. ................. 425/145 |
| 5,643,393 A | * | 7/1997 | Genovese et al. ........... 156/344 |
| 5,681,417 A | * | 10/1997 | Jacobs ......................... 156/344 |
| 5,766,403 A | | 6/1998 | Go |
| 5,896,787 A | * | 4/1999 | DeVincentis ................ 81/9.51 |
| 6,244,323 B1 | * | 6/2001 | Miller .......................... 156/584 |
| 6,582,527 B2 | * | 6/2003 | Marazzi et al. ................ 134/42 |

FOREIGN PATENT DOCUMENTS

| | | |
|---|---|---|
| EP | 0 679 912 A1 | 11/1995 |
| EP | 0 682 274 A1 | 11/1995 |
| FR | 2 504 507 A | 10/1982 |

OTHER PUBLICATIONS

Patent Abstracts of Japan. vol. 014, No. 490 (P–1122), Oct. 25, 1990 & JP 02 201301 A (Hitachi Cable Ltd.) Aug. 9, 1990.

* cited by examiner

Primary Examiner—Mark A. Osele
(74) Attorney, Agent, or Firm—Moser, Patterson & Sheridan, L.L.P.

(57) ABSTRACT

A method of stripping an optical fiber including a silica optical waveguide and a coating to be removed over a portion to be stripped includes making a cut in the coating of the portion to be stripped, depositing a stripping gel on the coating of the portion to be stripped, and cleaning the portion to be stripped to remove the coating and expose the silica of the fiber.

14 Claims, 3 Drawing Sheets

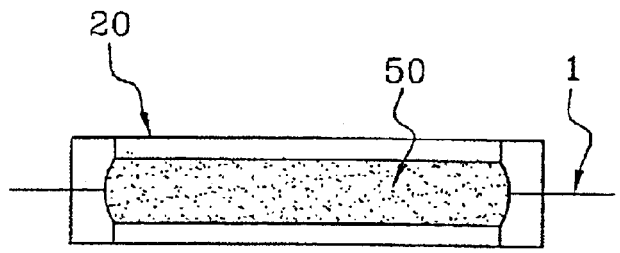
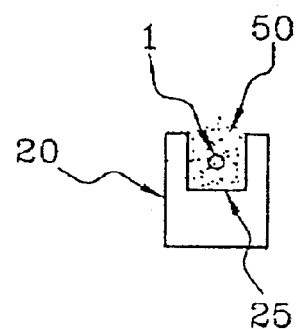
Fig. 4a
Fig. 4b
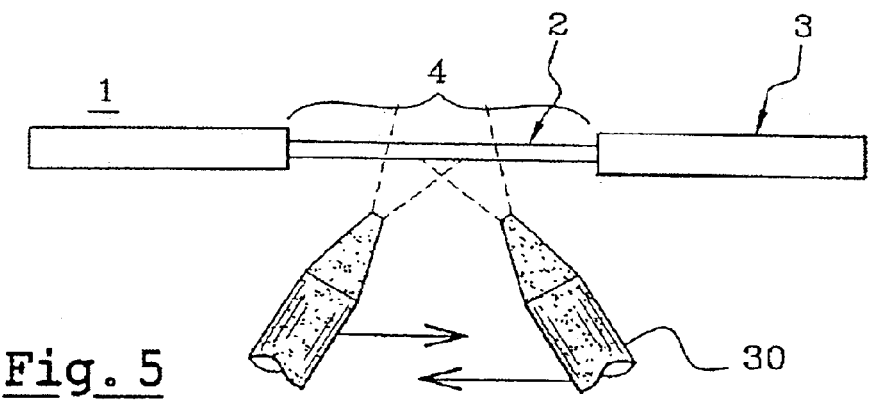
Fig. 5
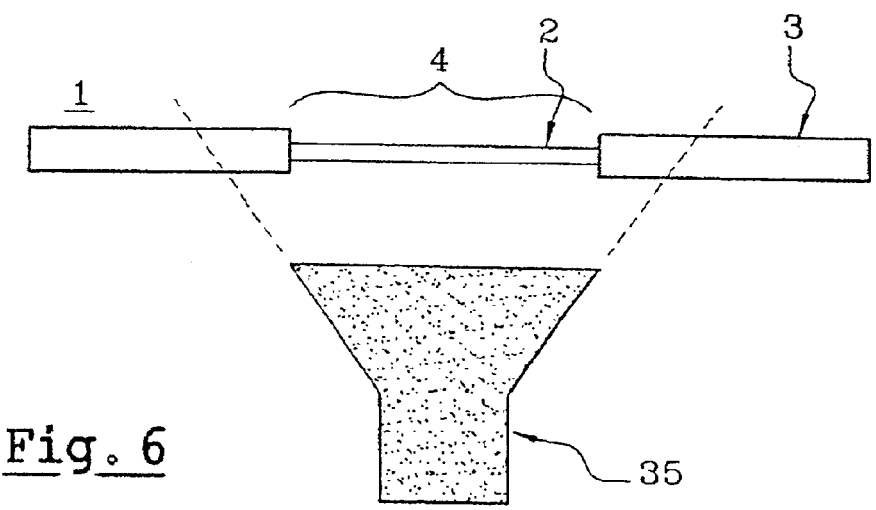
Fig. 6

METHOD OF STRIPPING AN OPTICAL FIBER

CROSS-REFERENCE TO RELATED APPLICATIONS

This application is based on French Patent Application No. 01 05 032 filed Apr. 12, 2001, the disclosure of which is hereby incorporated by reference thereto in its entirety, and the priority of which is hereby claimed under 35 U.S.C. §119.

BACKGROUND OF THE INVENTION

1. Field of the Invention

The present invention relates to a method of stripping an optical fiber consisting of removing the coating from a particular area of the fiber.

2. Description of the Prior Art

An optical fiber consists of a core surrounded by a cladding layer delimiting an optical waveguide surrounded by a coating layer that protects the optical fiber as a whole. As a general rule the core and the cladding of the optical fiber are made of silica and the coating layer is made of polymers.

Optical fibers have many and varied applications. In some applications it is necessary to manipulate the silica optical waveguide, for example for optically writing a Bragg grating. To carry out this kind of operation, the fiber must be stripped, etched and then recoated. It may also be necessary to strip the optical fiber at one end, for example to execute a weld or a connection. The method according to the invention can be used to strip any portion of the optical fiber, whether in the middle or at an end. By stripping is meant removing the protective polymer from the optical waveguide consisting of the core and the cladding, that is to say, in the remainder of the text, removing the coating in order to bare the silica.

The present invention relates essentially to a method of stripping an optical fiber in order to bare the silica.

The person skilled in the art knows various stripping methods. Stripping methods are subject to heavy constraints, however. This is because the length of the stripped fiber portion must be carefully controlled, the high strength of the fiber must not be compromised, and the edges of the coating at the limits of the stripped portion must be clean.

What is more, the stripped fiber becomes extremely fragile and delicate to manipulate.

One method routinely used by persons skilled in the art is described in the paper: "Effect of chemical stripping on the strength and surface morphology of fused silica optical fiber". Proc. Soc. Photo Optique Instrumentation Eng., vol 2074 pp 52–58. This kind of method consists of plunging the fiber portion to be stripped for 20 seconds into a bath of 98% sulfuric acid heated to 180–200° C. To do this, it is necessary to coil the fiber. The stripped fiber is then cleaned with ethanol and/or acetone.

The above prior art method has many drawbacks. Coiling the fiber immersed in the acid bath increases the risk of impinging on the silica, which is bared after the polymer of the coating is degraded, which could reduce the mechanical strength of the stripped fiber. It is also difficult to control the length of the stripped portion because the sulfuric acid migrates rapidly into the coating by capillary action. This causes an uneven edge of the remaining coating (known to the person skilled in the art as a "cauliflower edge").

The above method is also hazardous because of the proximity of inflammable products, such as alcohol, and pure sulfuric acid. The risk of acid burns is not negligible. All of this leads to heavy industrial constraints associated with temperature, relative humidity and, of course, rules for manipulation of the products.

Other prior art methods are based on the principle of softening the coating of the fiber by heating it, and then scraping it off.

For example, the international patent application WO 00/02076 proposes a method of stripping the end of an optical fiber by heating the fiber and scraping off the coating when it has become sufficiently softened.

Similarly, U.S. Pat. No. 6,123,801 describes a method of stripping any portion of an optical fiber, including a portion between its ends, by using a hot jet of inert gas to soften the coating. The power of the jet is such that the coating is blown off the fiber when it has become sufficiently softened. The jet is moved along the whole length of the portion of fiber to be stripped.

These prior art methods have all or some of the drawbacks already cited, in particular the use of heat.

Furthermore, it is noteworthy that none of the above prior art methods has yet been industrialized on a large scale.

The object of the present invention is to eliminate the drawbacks of the prior art.

To this end, the invention proposes a two-stage method, a first or mechanical stage which makes one or more cuts in the coating of the fiber and a second or chemical stage which softens the coating by the action of a stripping gel. The method according to the invention produces a stripped portion with clean edges and of perfectly controlled length, without compromising the mechanical strength of the optical fiber.

SUMMARY OF THE INVENTION

The invention relates more specifically to a method of stripping an optical fiber including a silica optical waveguide and a coating to be removed over a portion to be stripped, the method including the following steps:

making a cut in the coating of the portion to be stripped, depositing a stripping gel on the coating of the portion to be stripped, and cleaning the portion to be stripped to remove the coating and expose the silica of the fiber.

According to one feature of the invention the cut has a depth controlled in accordance with the nature of the fiber to be stripped in order to protect the optical waveguide of the fiber.

According to another feature of the invention the cut is circular.

In one application of the invention at least two cuts are made in the coating of the portion of the fiber to be stripped and the spacing between the cuts is adapted to suit the length of the portion to be stripped.

According to one feature of the invention the portion to be stripped is placed in a receptacle adapted to receive the stripping gel.

According to one feature of the invention the stripping gel has a suitable viscosity from 3 000 cps to 5 000 cps.

According to one feature of the invention the portion to be stripped is cleaned by cleaning jets adapted to clean the surface of the silica and to make a clean break in the coating at the edge of the portion to be stripped.

According to one feature of the invention the optical fiber is placed in a cassette with the portion to be stripped under tension.

According to one feature of the invention the portion of the optical fiber to be stripped is under a controlled tension and the cassette includes indexing means.

According to one advantageous feature of the invention the optical fiber remains in the cassette throughout the stripping process.

In respective embodiments of the invention the portion to be stripped is in the middle of the fiber and at an end of the fiber.

The present invention further relates to a system for implementing a method in accordance with the invention, which system includes:

a station for making a cut in the coating of the portion of the fiber to be stripped, and a stripping station for effecting the following operations:
positioning the portion of the fiber to be stripped in a receptacle,
depositing a stripping gel in the receptacle and allowing it to act on the coating of the fiber, and
cleaning and drying the stripped fiber portion.

According to one feature of the invention the system for implementing the method further includes a cassette for supporting the optical fiber and maintaining the portion of the fiber to be stripped under tension.

The present invention also provides an optical fiber comprising a silica waveguide and a coating that is removed over a stripped portion, in which fiber the edges of the coating at the ends of the stripped portion are smooth and oblique with a longitudinal depth less than twice the diameter of the optical fiber.

The method according to the invention preserves the specifications of the fiber defined in terms of the constraints applying to its mechanical strength, a controlled and reproducible length of the stripped portion, and the quality of the edges of the coating.

Furthermore, the method according to the invention can be carried out at room temperature and without manipulating unstable hazardous products. The stripping gel is stable at room temperature and normal relative humidity.

What is more, the method according to the invention lends itself readily to large-scale industrialization.

Other features and advantages of the invention will become clearly apparent after reading the following description, which is given by way of illustrative and non-limiting example and with reference to the accompanying drawings.

BRIEF DESCRIPTION OF THE DRAWINGS

FIGS. 4a and 4b are respectively a top view and a sectional view showing diagrammatically a stripping step of a method according to the invention.

FIG. 5 shows diagrammatically a cleaning step of a method according to the invention.

FIG. 6 shows diagrammatically a drying step of a method according to the invention.

DETAILED DESCRIPTION OF THE PREFERRED EMBODIMENT

The following description relates to a method of stripping an optical fiber irrespective of the diameter and the type of coating of said fiber and regardless of the length and the location of the portion of the fiber to be stripped. In particular, the method applies to stripping a portion in the middle of the fiber and to stripping an end of the fiber.

A device for implementing a method according to the invention can be adapted to suit any type of optical fiber and any type of coating, for example epoxy, polyurethane, silicone and other coatings.

Figure 1:
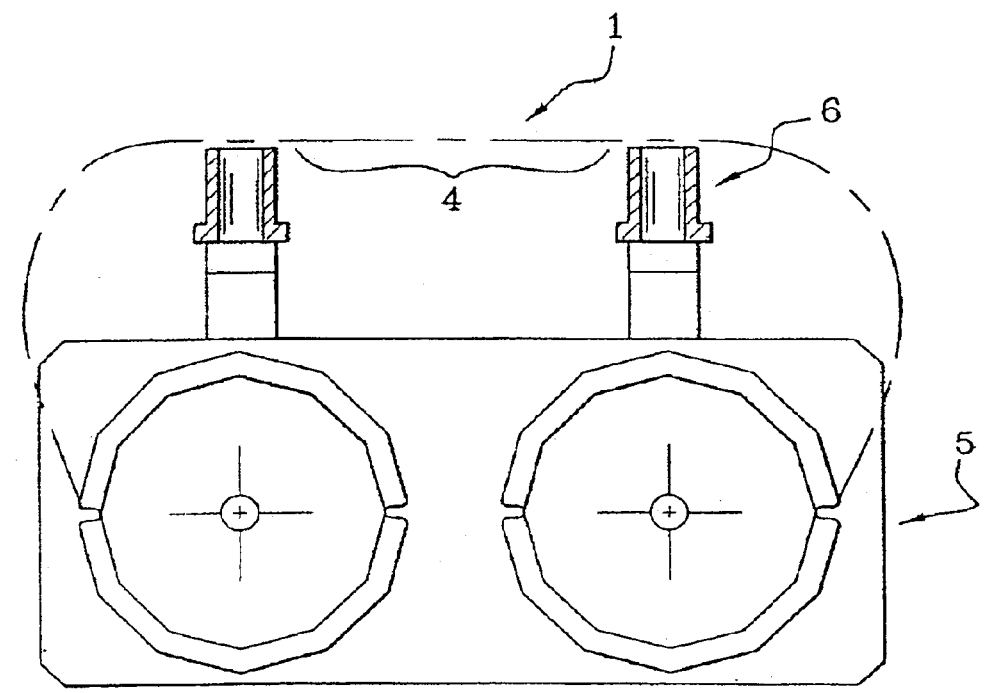
FIG. 1 is a diagram of a cassette used to hold an optical fiber.

Referring to FIG. 1, an optical fiber 1 to be stripped is first placed in a cassette 5, i.e. in a support including two coils and a central portion under tension.

A portion of the optical fiber 1, in this instance the portion 4 to be stripped, is therefore maintained under slight tension in the cassette 5. A clamp 6 is advantageously used to control the tension of the fiber portion 4 to be stripped and to ensure a constant position of the fiber 1 throughout the stripping process.

Placing an optical fiber 1 in a support cassette 5 of the above kind, as used in the context of the present invention, is known in the art. The cassette 5 includes in particular means for attaching it to various appropriate supports and indexing means known in the art.

Figure 2:
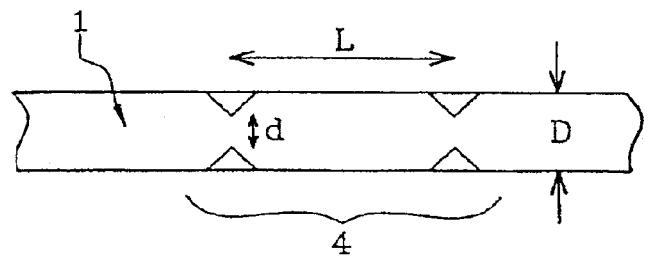
FIG. 2 shows diagrammatically cuts made in a fiber by a method according to the invention.

The first step specific to a method according to the invention consists of making a cut in the coating of the fiber. If the fiber portion to be stripped is at the end of the fiber, a single cut in the coating may suffice. If the portion to be stripped is in the middle of the fiber, it is preferable to make at least two cuts in the coating, as shown diagrammatically in FIG. 2.

In a preferred embodiment, for an optimum result, the cuts 10 are circular with a diameter d. Nevertheless, the cuts 10 can be square, for example, if tooling constraints impose this.

The number of cuts 10 and their spacing L and diameter d depend essentially on the length of the portion 4 to be stripped and on the type of fiber 1, i.e. its diameter D and the material of the coating 3. The cuts 10 must not impinge on the silica optical waveguide of the fiber and must not be at the ends of the portion to be stripped.

For example, for an optical fiber 1 having a diameter D of 250 $\mu$m and to be stripped over a portion 4 having a length of 85 mm, two cuts 10 are sufficient, with values of L from 65 mm to 75 mm and values of d from 170 $\mu$m to 200 $\mu$m.

Figure 3A:
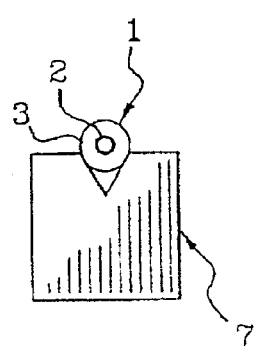
FIGS. 3a to 3c are diagrammatic views of a step of a method according to the invention of making the cuts.
Figure 3B:
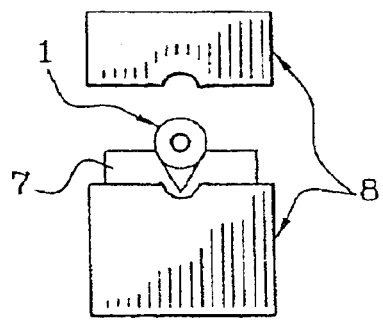
Figure 3C:
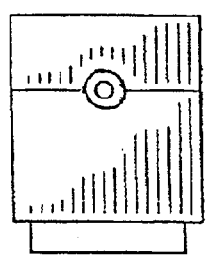

FIGS. 3a to 3c show diagrammatically the sub-steps of making the cuts 10 in the coating 3 of the fiber 1.

The fiber 1, supported in the cassette, is placed in a support 7 having a V-shaped groove perpendicular to the length of the fiber. Cutters 8 are then actuated to cut the coating 3 of the fiber 1 without cutting the optical waveguide 2. The cutters 8 can be readily replaced and their spacing adjusted to suit the type of fiber to be cut.

The second step specific to a method according to the invention consists of depositing a stripping gel on the fiber portion to be stripped, as shown diagrammatically in FIGS. 4a and 4b. To this end, the fiber portion 4 to be stripped is placed in a receptacle 20 adapted to receive the stripping gel 50.

The receptacle 20 is made of a material compatible with the stripping gel 50, for example a plastics material. It includes a groove 25 (FIG. 4b) whose width and depth depend on the optical fiber 1 to be stripped. For example, for a fiber with a diameter D of 250 μm, a U-shaped groove 3 mm by 3 mm is very suitable. Similarly, the length of the groove is directly related to the length of the portion 4 to be stripped (FIG. 4a). Thus a groove 84 mm long is very suitable for stripping the fiber 1 over a length of 85 mm.

The stripping gel 50 used in the context of the present invention has a suitable composition incorporating a solvent adapted to swell and soften the polymer or other material of the coating of the fiber. The stripping gel 50 penetrates into the cuts 10 previously made in the coating by capillary action and degrades said coating of the portion to be stripped. The stripping gel 50 has the optimum viscosity (from 3 000 cps to 5 000 cps, for example) to coat the coating of the fiber over the whole of its perimeter and to be able to penetrate into the cuts and propagate in the coating by capillary action. The viscosity of the stripping gel is furthermore such that it does not migrate beyond the receptacle 20, whose length defines the stripping length.

The optical fiber 1 remains in the receptacle 20 for a controlled time period to allow the stripping gel 50 to act on the coating of the fiber. The time for which the stripping gel is allowed to act depends essentially on the diameter of the coating to be removed and the material from which it is made, and can vary from a few seconds to a few minutes.

A method according to the invention further includes a cleaning step shown in FIG. 5 and a drying step shown in FIG. 6. Cleaning jets 30, for example jets of ethanol, are directed onto the portion 4 to be stripped to remove the softened coating and expose the optical waveguide 2 of the fiber 1. The pressure of the jets 30 is controlled to remove all trace of the stripping gel 50, to wash the silica 2 and to make a clean break in the coating 3 where it is softened at the edges of the portion 4 to be stripped. A step of drying the silica 2 follows the cleaning step, for example using jets 35 of dry nitrogen.

Figure 7:
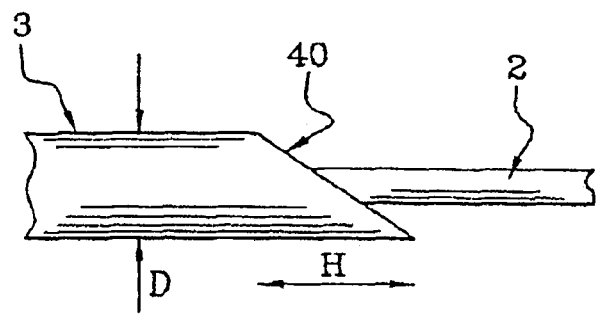
FIG. 7 shows diagrammatically an edge of a portion stripped by a method according to the invention.

FIG. 7 shows diagrammatically an edge 40 of the coating as obtained using a stripping method according to the invention. The edge 40 of the coating may be oblique, as shown in the figure, but its slope is steep, and its longitudinal depth H is less than twice the diameter D of the fiber 1 (H≦2D).

It is clear from the foregoing description that a method according to the invention is carried out entirely at room temperature and requires no special atmosphere.

The risk of deterioration of the bared silica is also reduced because the fiber remains in the cassette throughout the stripping process. The fiber can advantageously also remain in the cassette during optical writing.

What is more, the tensile strength of the fiber is not reduced by the stripping operation, because it is held straight by the cassette throughout the stripping process, and the risk of a hard object touching the silica is therefore greatly reduced.

Figure 8:
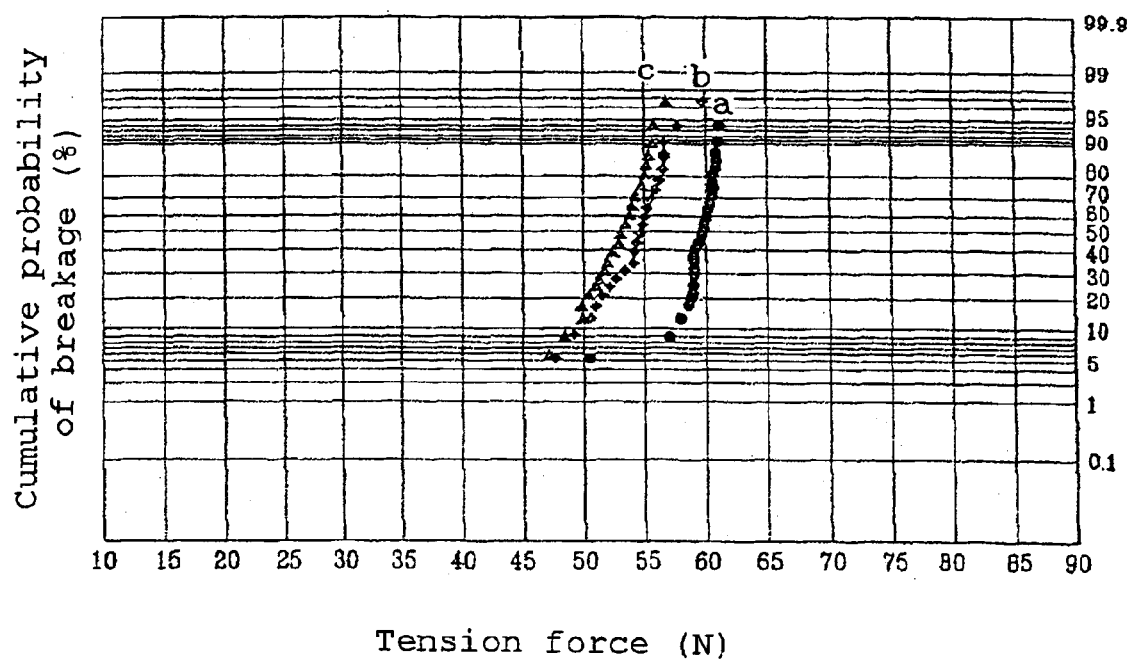
FIG. 8 is a graph showing the probability of an optical fiber breaking as a function of an applied tension force.

The FIG. 8 graph shows this result clearly. The curve a corresponds to an optical fiber with its coating. The curve b corresponds to a fiber stripped over a length of 36 mm and the curve c corresponds to a fiber stripped over a length of 85 mm.

Note further that a method according to the invention produces a stripped fiber portion that is perfectly controlled, the tolerance on the stripped length being of the order of ±1 mm, and reproducible over a plurality of optical fibers.

What is claimed is:

1. A method of stripping an optical fiber including a silica optical waveguide and a coating to be removed over a portion to be stripped, said method comprising:

making a cut in the coating of said portion to be stripped;

depositing a stripping gel on said coating of said portion to be stripped; and cleaning said portion to be stripped to remove said coating and expose said silica of said fiber; wherein said optical fiber is placed in a cassette with said portion to be stripped under tension.

2. The stripping method claimed in claim 1, wherein said cut has a depth controlled in accordance with the nature of the fiber to be stripped in order to protect said optical waveguide of said fiber.

3. The stripping method claimed in claim 1, wherein said cut is circular.

4. The stripping method claimed in claim 1, wherein at least two cuts are made in said coating of said portion of said fiber to be stripped and the spacing between said cuts is adapted to suit the length of said portion to be stripped.

5. The stripping method claimed in claim 1, wherein said portion to be stripped is placed in a receptacle adapted to receive said stripping gel, said portion to be stripped remaining in the receptacle for a controlled period of time to allow the stripping gel to act on the said portion.

6. The stripping method claimed in claim 1, wherein said stripping gel has a suitable viscosity from 3000 cps to 5000 cps.

7. The stripping method claimed in claim 1, wherein said portion to be stripped is cleaned by cleaning jets adapted to clean the surface of said silica and to make a clean break in said coating at the edge of said portion to be stripped.

8. The stripping method claimed in claim 1, further including a step of drying said stripped portion.

9. The stripping method claimed in claim 1, wherein said portion of said optical fiber to be stripped is under a controlled tension.

10. The stripping method claimed in claim 1, wherein said cassette includes indexing means.

11. The stripping method claimed in claim 1, wherein said optical fiber remains in said cassette throughout the stripping process.

12. The stripping method claimed in claim 1, wherein said portion to be stripped is in the middle of said fiber.

13. The stripping method claimed in claim 1, wherein said portion to be stripped is at an end of said fiber.

14. A system for implementing a method of stripping an optical fiber including a silica optical waveguide and a coating to be removed over a portion to be stripped, which system comprising:

a station for making a cut in said coating of said portion of said fiber to be stripped;

a stripping station for effecting the following operations: positioning said portion of said fiber to be stripped in a receptacle, depositing a stripping gel in said receptacle and allowing it to act on said coating of said fiber, and cleaning and drying said stripped fiber portion; and a cassette for supporting said optical fiber and maintaining said portion of said fiber to be stripped under tension.

* * * * *